(12) United States Patent
Kawakami

(10) Patent No.: US 7,938,525 B2
(45) Date of Patent: *May 10, 2011

(54) INK JET RECORDING METHOD

(75) Inventor: Hiroshi Kawakami, Fujinomiya (JP)

(73) Assignee: Fujifilm Corporation, Tokyo (JP)

(*) Notice: Subject to any disclaimer, the term of this patent is extended or adjusted under 35 U.S.C. 154(b) by 131 days.

This patent is subject to a terminal disclaimer.

(21) Appl. No.: 12/391,643

(22) Filed: Feb. 24, 2009

(65) Prior Publication Data

US 2009/0244121 A1    Oct. 1, 2009

(30) Foreign Application Priority Data

Feb. 27, 2008 (JP) ................................. 2008-046777

(51) Int. Cl.
*G01D 11/00* (2006.01)

(52) U.S. Cl. ........... 347/100; 347/95; 347/105; 347/101

(58) Field of Classification Search .................. 347/100, 347/95, 96, 101, 105; 523/160, 161; 106/31.6, 106/31.13, 31.27; 428/195, 32.1

See application file for complete search history.

(56) References Cited

U.S. PATENT DOCUMENTS

| | | | | |
|---|---|---|---|---|
| 6,737,128 B2* | 5/2004 | Kasahara | ............. | 428/32.31 |
| 6,838,135 B2* | 1/2005 | Kasahara | ............. | 347/105 |
| 6,852,379 B2* | 2/2005 | Kasahara | ............. | 347/105 |
| 6,908,648 B2* | 6/2005 | Kasahara | ............. | 428/32.25 |
| 2001/0023266 A1* | 9/2001 | Miyabayashi | ............. | 523/161 |
| 2009/0167832 A1 | 7/2009 | Kawakami et al. | | |

FOREIGN PATENT DOCUMENTS

| | | |
|---|---|---|
| JP | 63-60784 A | 3/1988 |
| JP | 2001-96905 A | 4/2001 |
| JP | 2004-1412 A | 1/2004 |
| JP | 2004-035854 A | 2/2004 |
| JP | 2005-336496 A | 12/2005 |
| JP | 2006-110771 A | 4/2006 |
| JP | 2007-177007 A | 7/2007 |

OTHER PUBLICATIONS

Office Action issued for U.S. Appl. No. 12/344,092 dated Sep. 7, 2010.
Office Action issued for U.S. Appl. No. 12/344,092 dated Mar. 22, 2010.

* cited by examiner

*Primary Examiner* — Manish S Shah
(74) *Attorney, Agent, or Firm* — Sughrue Mion, PLLC

(57) ABSTRACT

The invention provides an ink jet recording method including applying an ink onto an ink jet recording medium by ink jet technology, the recording medium containing a support and an ink receptive layer which is provided on or above the support and contains a water-soluble aluminum compound, and the ink containing a dye and 8% by mass or more of a water-soluble solvent based on the total amount of the ink, the water-soluble solvent having a SP value of 24 $(MPa)^{1/2}$ or less according to the Hoy method and a molecular weight of 220 or more.

5 Claims, No Drawings

INK JET RECORDING METHOD

CROSS-REFERENCE TO RELATED APPLICATION

This application claims priority under 35 USC 119 from Japanese Patent Application No. 2008-046777 filed on Feb. 27, 2008, the disclosure of which is incorporated by reference herein.

BACKGROUND OF THE INVENTION

1. Technical Field

The present invention relates to an ink jet recording method.

2. Description of the Related Art

An ink jet recording method has become widely used from the viewpoints that recording can be carried out on various recording materials, and the hardware (device) is relatively inexpensive and compact and is superior in quietness. With recent development of high-resolution ink jet printers, hardware (device) and various ink jet recording media, so-called "photo-like" high quality images have become possible.

An ink jet recording medium in which a porous ink receptive layer containing amorphous silica or the like as a pigment and polyvinyl alcohol or the like as a binder is formed on paper or the like as a support has been known as a recording medium to be used in the ink jet recording method.

Technology involving ink jet recording media which use zirconium compounds or aluminum compounds for the ink jet recording medium have been examined in recent years. For example, an ink jet recording medium is known in which a water-soluble zirconium compound is included in an ink receptive layer away from a support and the water-soluble aluminum compound is distributed in a greater amount on the side near the support in order to improve waterproofing properties and suppress bleeding under high humidity conditions and bronzing (for example, see Japanese Patent Application Laid-Open (JP-A) No. 2006-110771).

On the other hand, an ink containing 2,5-dimethyl-2,5-hexandiol has been known as an ink for ink jet recording which provides improved properties such as prevention of beading and resistance to light (for example, see JP-A No. 2004-35854). Further, an ink containing a compound having a specific structure which has an ethyleneoxy chain and a propyleneoxy chain (for example, see JP-A No. 2005-336496), and an ink containing water and an organic solvent having a specific SP value at a specific ratio (for example, see JP-A No. 2007-177007) are also known as inks which improve bleeding prevention properties and the like.

SUMMARY

However, it is found that when the ink jet recording is performed, particularly when a dye-containing ink is used, changes in the color hue may occur in accordance with time lapse from immediately after printing.

The present invention has been made in consideration of the above-described conventional techniques, and provides an ink jet recording method which can suppress the change in color hue which occurs in accordance with time lapse from immediately after printing.

As a result of intensive examination, the present inventors found that the change in color hue may be suppressed by employing a specific combination of a component in an ink receptive layer and a formulation of an ink to achieve the present invention.

Namely, the present invention provides an ink jet recording method comprising applying an ink onto an ink jet recording medium by ink jet technology, the recording medium comprising a support and an ink receptive layer which is provided on or above the support and comprises a water-soluble aluminum compound, and the ink comprising a dye and 8% by mass or more of a water-soluble solvent based on the total amount of the ink, the water-soluble solvent having a SP value of 24 $(MPa)^{1/2}$ or less according to the Hoy method and a molecular weight of 220 or more.

DETAILED DESCRIPTION

The ink jet recording method of the invention is an ink jet recording method including applying an ink onto an ink jet recording medium by ink jet technology, the recording medium having at least a support and an ink receptive layer which is provided on or above the support and contains at least a water-soluble aluminum compound, and the ink contains at least a dye and 8% by mass or more of a water-soluble solvent based on the total amount of the ink, the water-soluble solvent having a SP value of 24 $(MPa)^{1/2}$ or less according to the Hoy method and a molecular weight of 220 or more.

The ink jet recording method of the invention having the above configuration can suppress change in color hue of an image which may occur immediately after ink jet printing of the image.

An ink jet recording medium used in the invention is explained hereinafter followed by explanations of ink and the like used in the invention.

Ink Jet Recording Medium

The ink jet recording medium used in the invention has at least an ink receptive layer which contains at least a water-soluble aluminum compound and is formed on or above a support. When the water-soluble aluminum compound is not contained in the ink receptive layer, the change in color hue tends to be further increased.

While the distribution of the concentration of aluminum in the thickness direction of the ink receptive layer is not particularly limited, it is preferable that a concentration of aluminum in a portion of the ink receptive layer which extends from the surface to a depth of 5 μm in the thickness direction of the ink receptive layer is lower than a concentration of aluminum in a portion of the ink receptive layer which extends from the surface to a depth of 20 μm in the thickness direction of the ink receptive layer. Such a configuration of the ink receptive layer may further suppress the change in color hue, and may further suppress the occurrence of the bronzing.

The ink receptive layer may further contains a water-soluble zirconium compound. While the distribution of the concentration of the water-soluble zirconium compound is not particularly limited, it is preferable that the larger amount of the water-soluble zirconium compound is distributed in an area farther from the support in the ink receptive layer, and it is more preferable that the larger amount of the water-soluble zirconium compound is distributed in the vicinity of the surface of the ink receptive layer. Such a configuration of the ink receptive layer may further suppress bleeding under high humidity conditions, and may further improve color developing properties.

The distribution of the concentration of aluminum in the thickness direction of the ink receptive sublayer and the distribution of the water-soluble aluminum compound which will be described hereinafter can be confirmed by measuring a concentration of aluminum element with respect to a section sample of the ink receptive layer which is produced, for example, by microtome with Electron Probe Micro Analyzer (EPMA) along the thickness direction of the ink receptive layer. The distribution of the water-soluble zirconium compound can be also confirmed in the same manner.

Specifically, the mass ratio of [(the concentration of aluminum in a portion of the ink receptive layer which extends from the surface to a depth of 5 µm in the thickness direction of the ink receptive layer)/(the concentration of aluminum in a portion of the ink receptive layer which extends from the surface to a depth of 20 µm in the thickness direction of the ink receptive layer)] is preferably 0 or more and less than 1.0, preferably 0 or more and less than 0.8, further preferably 0 or more and less than 0.5, and most preferably 0 (namely, the form in which the thickness of 5 m from the surface include substantially no aluminum).

The thickness of the ink receptive layer, which means the total thickness of all layers included in the ink receptive layer in the case that the ink receptive layer consists of a plurality of layers, in the invention is not particularly limited, while it is preferably in a range of 20 µm to 80 µm, more preferably in a range of 25 µm to 60 µm, and particularly preferably in a range of 30 µm to 50 µm.

The ink jet recording medium used in the invention may have a layer other than the ink receptive layer (e.g. an interlayer and an undercoating layer), if necessary.

Hereinafter, the ink receptive layer, the support and the like of an ink jet recording medium used in the invention will be described.

Ink Receptive Layer

The ink receptive layer of the ink jet recording medium used in the invention may be either a single layered structure or a structure having two or more layers. From the viewpoint of setting the concentration of aluminum to the above-described distribution, it is preferable that the ink receptive layer has a structure having at least two layers.

Hereinafter, an exemplary embodiment in which the ink receptive layer includes at least two layers will be described, while the invention is not limited thereto. In embodiments in which the ink receptive layer has a single layered structure, the following disclosures regarding properties of each ink receptive sublayer correspond to properties of the single ink receptive layer.

Explanation in the followings are given with defining that: a layer which configures the ink receptive layer and is nearer the support than an ink receptive layer B, which is explained in the following, is defined as an ink receptive sublayer A (and sometimes referred to as a "lower layer"); and a layer which configures the ink receptive layer and is farther from the support than the ink receptive sublayer A is defined as an ink receptive sublayer B (and sometimes referred to as an "upper layer").

Ink Receptive Sublayer B

In embodiments, the ink receptive sublayer B contains silica fine particles as a primary component thereof.

In preferable embodiments, the ink receptive sublayer B further contains a water-soluble zirconium compound. The ink receptive sublayer B may contain other components, if necessary.

The ink receptive sublayer B is a layer which is farther from the support than the ink receptive sublayer A in the ink receptive layer. In other words, the ink receptive sublayer B may be an uppermost layer which is the furthest away from the support or may be other than the uppermost layer (that is, it may have an uppermost layer such as a colloidal silica layer over the ink receptive sublayer B). From the viewpoint of preventing bleeding under high humidity conditions and improving color developing properties, it is preferable that the ink receptive sublayer B is an uppermost layer. Further, the ink receptive sublayer B may be either a single layered structure or a structure having two or more layers.

There is no particularly limitation to a method for forming the ink receptive sublayer B containing the water-soluble zirconium compound. Examples thereof include a method for forming an ink receptive sublayer B using a coating liquid containing the water-soluble zirconium compound (for example, an ink receptive layer coating liquid B-1 described below), a method including applying, to the ink receptive sublayer B formed in advance, an aqueous solution containing the water-soluble zirconium compound from the top of the ink receptive sublayer B (namely, from the side opposite from the support), and a method including the combination of these two methods.

The ink receptive sublayer B may or may not contain a water-soluble aluminum compound. When the ink receptive sublayer B contains the water-soluble aluminum compound, it is preferable that the amount of the water-soluble aluminum compound contained in the ink receptive sublayer B is less than the amount of the water-soluble aluminum compound contained in the ink receptive sublayer A from the viewpoint of suppression of bronzing.

Specifically, it is preferable that the mass ratio of [(the amount of the water-soluble aluminum compound contained in the ink receptive sublayer B)/(the amount of the water-soluble aluminum compound contained in the ink receptive sublayer A)] is 0 or more and less than 1.0. The mass ratio is more preferably 0 or more and less than 0.8, and particularly preferably 0 or more and less than 0.5. Most preferably, the mass ratio is 0 (namely, the embodiment in which the ink receptive sublayer B does not substantially contain the water-soluble aluminum compound is most preferable).

The content of the water-soluble zirconium compound in the ink receptive sublayer B is not particularly limited, while the content is preferably in the range of 0.5% by mass to 15% by mass, more preferably in the range of 1% by mass to 10% by mass, and particularly preferably in the range of 4% by mass to 10% by mass based on the content of silica fine particles in the ink receptive sublayer B.

The thickness of the ink receptive sublayer B is not particularly limited, while the ink receptive sublayer B is preferably thinner from the viewpoint of effectively obtaining effects achieved by the invention. Specifically, the dried amount of the ink receptive sublayer B is preferably 8 $g/m^2$ or less, and is more preferably in the range of 1 $g/m^2$ to 7 $g/m^2$.

Ink Receptive Sublayer A

In embodiments, the ink receptive sublayer A contains silica fine particles as a primary component thereof.

It is preferable that the ink receptive sublayer A contains at least a part of the water-soluble aluminum compound from the viewpoint of having the larger amount of the water-soluble aluminum compound be distributed on the side nearer to the support in the entire ink receptive layer. The ink receptive sublayer A may contain other components, if necessary. Further, the ink receptive sublayer A may be either a single layered structure or a structure having two or more layers.

The amount of the water-soluble aluminum compound contained in the ink receptive sublayer A is not particularly limited, while it is preferably in the range of 0.5% by mass to 15% by mass, and is more preferably in the range of 1% by mass to 10% by mass based on the amount of silica fine particles contained in the ink receptive sublayer A.

The thickness of the ink receptive sublayer A is not particularly limited, while the ink receptive sublayer A is preferably thicker from the viewpoint of ensuring the rate and capacity of ink absorption of the ink receptive layer. Specifically, the dried amount of the ink receptive sublayer A is preferably 12 g/m² or more, and is more preferably 15 g/m² or more.

Distributions of Water-Soluble Zirconium Compound and Water-Soluble Aluminum Compound In the invention, it is preferable that the larger amount of the water-soluble aluminum compound is distributed in an area nearer to the support in the ink receptive layer from the viewpoint of improving waterproof properties, ink absorbing properties and color developing properties and suppressing bronzing.

On the other hand, in the invention, it is preferable that the larger amount of the water-soluble zirconium compound is distributed in an area farther from the support in the ink receptive layer, and it is more preferable that the larger amount of the water-soluble zirconium compound is distributed in the vicinity of the surface of the ink receptive layer, from the viewpoint of suppression of bleeding under high humidity conditions and improvement in color developing properties.

When the distribution of the water soluble aluminum compound in the thickness direction of the ink receptive layer having at least two layers (hereinafter simply referred to as an "entire of ink receptive layer") and the distribution of the water-soluble zirconium compound in the thickness direction of the entire of ink receptive layer are taken in consideration, it is preferable that the thickness of the ink receptive sublayer B is relatively small and the thickness of the ink receptive sublayer A is relatively large from the viewpoint of more effectively obtaining the above-described effects.

In the invention, the water-soluble zirconium compound can be contained in the ink receptive sublayer B which is away from the support (namely, the water-soluble zirconium compound is present in the vicinity of the surface of the ink receptive layer), and the larger amount of the water-soluble aluminum compound is distributed on the area nearer to the support. The combination of the distribution conditions may enable to suppress the bronzing and the bleeding under high humidity conditions so that color developing properties, waterproof properties, and ink absorbing properties can be further improved.

Hereinafter, each component contained in the ink receptive layer of the invention will be described.

Silica Fine Particles

In preferable embodiments, the ink receptive sublayer included in the ink receptive layer of the ink jet recording medium used in the invention (for example, the ink receptive sublayer A, the ink receptive sublayer B, and/or other layers which can be used if necessary) contains silica fine particles as a primary component thereof.

Here, the expression of "contain(ing) silica fine particles as a primary component" means that the ratio of the amount of silica fine particles contained in the ink receptive sublayer based on the total solid content of the ink receptive layer is 60% by mass or more, preferably 65% by mass or more, and further preferably 70% by mass or more. The upper limit of the ratio of the content of the silica fine particles is approximately 95% by mass. At least one of fumed silica and wet method silica, which are synthetic silica, is used as silica fine particles. From the viewpoint of obtaining good ink absorbing properties and color developing properties, the fumed silica is more preferable.

The fumed silica is also referred to as a dry process silica and is generally produced by flame hydrolysis. Specifically, the fumed silica which is produced by a method including burning tetrachlorosilane with hydrogen and oxygen is generally known. In place of the tetrachlorosilane, silanes such as methyltrichlorosilane or trichlorosilane may be used alone or in combination with tetrachlorosilane. The fumed silica can be commercially available as AEROSIL (trade name, manufactured by Japan Aerosil Inc.) and as QS TYPE (trade name, manufactured by TOKUYAMA Corp.).

The average primary particle diameter of the fumed silica is preferably 5 nm to 50 nm. In order to obtain higher gloss, it is preferable to use the fumed silica whose average primary particle diameter is 5 nm to 20 nm and whose specific surface area measured by BET adsorption method is 90 m²/g to 400 m²/g. The BET adsorption method is one of methods for measuring a surface area of a powder material by a gas phase adsorption method and is a method for obtaining a total surface area possessed by 1 g of a sample, i.e., a specific surface area of the sample, from an adsorption isotherm. Nitrogen gas is usually used as an adsorption gas. The most frequently-used method thereof includes measuring an amount of a gas to be absorbed by the sample (an adsorption amount of the sample) from the change in a pressure or a volume of an adsorbed gas. The most famous equality for representing isotherm of polymolecular adsorption is the Brunauer-Emmett-Teller equality which is also referred to as the BET equality and has widely been used for determining a surface area of a substance to be examined. The surface area of a substance can be obtained by measuring an adsorption amount of the substance based on the BET equality and multiplying the amount with a surface area of the substance occupied by one adsorbed molecule.

In preferable embodiments, the fumed silica is present in a state that primary particles having a size of several nanometers to several tens of nanometers are connected with each other to form a network structure or a chain form and secondarily aggregated. The aggregate particles are preferably dispersed so that the average particle diameter of the aggregate particles (secondary particles) is 500 nm or less, which is more preferably 300 nm or less. The lower limit of the diameter of the secondary particle is about 50 nm. Here, the average particle diameter of the aggregate particles may be determined by photographing with a transmission electron microscope. In a simpler manner, the average particle diameter may be measured as the number median diameter using a laser-scattering particle size distribution analyzer (for example, trade name: LA910, manufactured by HORIBA, Ltd.).

The wet method silica can be further classified as any one of sedimentation method silica, gel method silica, and sol method silica according its production method.

The sedimentation method silica is produced by reacting sodium silicate with sulfuric acid under alkaline condition. Silica particles grown in the production process are aggregated and precipitated, and further subjected to filtrating, water washing, drying, crushing, and classifying to form a commercial product. Secondary particles of silica produced by the method are loosely-aggregate particles and can be relatively easily crushed. Examples of the sedimentation method silica include commercially available products such as NIPSEAL (trade name, manufactured by TOSOH SILICA CORPORATION), TOKUSEAL or FINESEAL (both trade names, manufactured by Tokuyama Corp.).

The gel method silica is produced by reacting sodium silicate with sulfuric acid under acidic condition. In this case, small silica particles are dissolved during aging and re-precipitated in spaces among large primary particles so as to allow the primary particles to connect with each other. As a result thereof, clear primary particles disappear and relatively hard aggregate particles having an inner void structure are formed. Examples of the gel method silica include commercially available products such as MIZUKASIL (trade name, manufactured by MIZUSAWA INDUSTRIAL CHEMICALS, LTD.) or SYLOJET (trade name, manufactured by Grace Japan).

The sol method silica is also referred to as a colloidal silica, and can be produced by heat-aging silica sol which can be obtained by metathesis of sodium silicate using acid or the like or which is subjected to passing through an ion exchange resin layer. Examples of the sol method silica include commercially available product SNOWTEX (trade name, manufactured by NISSAN CHEMICAL INDUSTRIES, LTD.).

Examples of the wet method silica include sedimentation method silica or gel method silica. The average particle diameter of the wet method silica (average secondary particle diameter) is usually 1 μm or more. In the invention, it is preferable that the wet method silica has been crushed until the average particle diameter becomes 500 nm or less. More preferably, the wet method silica has been crushed until the average particle diameter becomes 300 nm or less. The lower limit of the particle diameter is approximately 50 nm. The particle diameter of the crushed wet method silica can be determined by using a transmission electron microscope or a laser-scattering particle size distribution analyzer as described above.

It is preferable that the crushing of the wet method silica includes: first dispersing including adding silica fine particles to a dispersion medium and mixing (pre-dispersing) to obtain a coarse dispersion liquid: and second dispersing including crushing the silica fine particles in the coarse dispersion liquid. The pre-dispersing in the first dispersing can be performed by using a usual propeller stirring, sawtooth blade disperser, turbine stirring, homomixer stirring and/or ultrasonic stirring. A wet dispersing method in which the silica dispersed in dispersion medium is crushed mechanically can be preferably used as the method for crushing the wet method silica. Examples of a wet type disperser which can be used in the crushing include media mills such as a ball mill, a bead mill, or a sand grinder; pressure dispersers such as a high pressure homogenizer or an ultra high pressure homogenizer, an ultrasonic disperser, and a thin-film spin type disperser. A media mill such as a bead mill can be particularly preferably used in the invention.

The wet method silica preferably has an average particle diameter (average secondary particle diameter) of 5 μm or more. A dispersion having a higher concentration can be obtained by crushing silica having a relatively larger particle diameter. The upper limit of the average particle diameter of the wet method silica to be used in the invention is not particularly limited, while the average particle diameter of the wet method silica is usually 200 μm or less.

Sedimentation method silica can be preferably used as the wet method silica in the invention. As described above, secondary particles of the sedimentation method silica, which are loose aggregate particles, are suitable to be subjected to the crushing.

In the invention, the silica fine particles are preferably cationized by adding a cationic polymer. It is preferable to have the cationic polymer be contained in silica fine particles in the dispersing or the crushing. The cationic polymer will be described hereinafter.

Binder

The ink receptive sublayer included in the ink receptive layer of the ink jet recording medium used in the invention (for example, the ink receptive sublayer A, the ink receptive sublayer B and/or other layers which can be used if necessary) preferably contains a binder.

There is no particular limitation to the binder, while it is preferable to use a hydrophilic binder in view of maintaining coating film characteristics of the layer containing the binder as well as providing high transparency and higher ink permeability to the layer containing the binder.

Examples of the hydrophilic binder include polyvinyl alcohol, polyethylene glycol, starch, dextrin, carboxymethylcellulose and modified compounds of any one of these. A particularly preferable example of the hydrophilic binder is a partially- or fully-saponified polyvinyl alcohol. Among polyvinyl alcohols, the partially- or fully-saponified polyvinyl alcohol having a degree of saponification of 80% or more is particularly preferable. It is preferable to use polyvinyl alcohol having an average degree of polymerization of 500 to 5000.

The binder may be used singly or in combination of two or more thereof.

The mass ratio (B/P) of the amount of the binder (B), such as the hydrophilic binder, to the amount of the silica fine particles (P) in each ink receptive sublayer is preferably in the range of 5% by mass to 30% by mass, and is more preferably 5% by mass to 25% by mass.

In the invention, the mass ratio (B/P) of the ink receptive sublayer B is preferably smaller than the mass ratio (B/P) of the ink receptive sublayer A in view of allowing ink to smoothly transfer from the ink receptive sublayer B, which is farther from the support, to the ink receptive sublayer A, which is closer to the support.

Water-Soluble Zirconium Compound

The ink receptive layer of the ink jet recording medium used in the invention may contain a water-soluble zirconium compound. In embodiments, it is preferable that the ink receptive sublayer included in the ink receptive layer of the ink jet recording medium used in the invention (for example, the ink receptive sublayer B and/or other layers which can be used if necessary) contains the water-soluble zirconium compound.

The water-soluble zirconium compound may be any of inorganic salts, simple salts or double salts of organic acids, and metal complexes.

Examples of the water-soluble zirconium compound include zirconium acetate, zirconium nitrate, basic zirconium carbonate, zirconium hydroxide, zirconium ammonium carbonate, zirconium potassium carbonate, zirconium sulfate, zirconium fluoride, zirconium chloride, zirconium chloride octahydrate, zirconium oxychloride, and zirconium hydroxychloride.

Among the water-soluble zirconium compounds, those which can be stably added to the coating liquid for forming the ink receptive sublayer are preferable. Particularly, zirconium acetate (zirconyl acetate) and zirconium oxychloride are preferable.

Examples of the water-soluble zirconium compound include commercially available products such as ZIRCOSOL ZA-20, ZIRCOSOL ZA-30, and ZIRCOSOL ZC-2 (all trade names, manufactured by Daiichi Kigenso Kagaku Kogyo Co., Ltd.). Examples thereof further include commercial products available from Nippon Light Metal Co., Ltd.

The water-soluble zirconium compound may be used singly or in combination of two or more thereof.

Water-Soluble Aluminum Compound

The ink receptive layer of the ink jet recording medium used in the invention contains a water-soluble aluminum compound. More specifically, the ink receptive sublayer included in ink receptive layer of the ink jet recording medium used in the invention (for example, the ink receptive sublayer A and/or other layers which can be used if necessary) contains the water-soluble aluminum compound.

The water-soluble aluminum compound to be used in the invention may be any of inorganic salts, simple salts or double salts of organic acids, and metal complexes.

Examples of the inorganic salt of the water-soluble aluminum compound which are known and can be used in the invention include aluminum chloride, hydrate of aluminum chloride, aluminum sulfate, hydrate of aluminum sulfate, and ammonium alum. Examples thereof further include a basic polyaluminum hydroxide compound, which is an inorganic aluminum-containing cationic polymer.

Among the water-soluble aluminum compounds, those which can be stably added to the coating liquid for forming the ink receptive sublayer are preferable. A basic polyaluminum hydroxide compound, which is a water-soluble polyaluminum hydroxide, the main component of which is represented by the following formula 1, 2 or 3, and which stably contains a basic and high molecular polynuclear condensation ion such as $[Al_6(OH)_{15}]^{3+}$, $[Al_8(OH)_{20}]^{4+}$, $[Al_{13}(OH)_{34}]^{5+}$, or $[Al_{21}(OH)_{60}]^{3+}$, is preferably used.

$[Al_2(OH)_nCl_{6-n}]_m$  Formula 1

$[Al(OH)_3]_n AlCl_3$  Formula 2

$l_n(OH)_m Cl_{(3n-m)} \; 0<m<3n$  Formula 3

These compounds of various grades can be easily obtained as commercially available products such as a water treatment agent (trade name: POLYALUMINUM CHLORIDE (PAC), manufactured by Taki Chemical Co. Ltd.), POLYALUMINUM HYDROXIDE (PAHO) (trade name, manufactured by Asada Kagaku Co. Ltd.), ALFINE (trade name, manufactured by Taimei CHEMICALS Co., Ltd.), or PURACHEM WT (trade name, manufactured by Rikengreen Co. Ltd.). Commercial products of these compounds for the similar applications are also available from other manufacturers. These commercially available products can be used directly in the invention.

The water-soluble aluminum compound may be used singly or in combination of two or more thereof.

Other Components

The ink receptive sublayer included in the ink receptive layer of the ink jet recording medium used in the invention may further contain components other than the above-described components if necessary.

Cationic Polymer

As described above, the ink receptive sublayer may contain a cationic polymer in order to cationize silica fine particles and other purposes.

Examples of the cationic polymer include a water-soluble cationic polymer having a quaternary ammonium group, a phosphonium group, or acid adducts of primary to tertiary amines. Specific examples thereof include polyethyleneimine, poly dialkyl diallylamine, polyallylamine, alkylamine epichlorohydrin polycondensate, and cationic polymers described in JP-A Nos. 59-20696, 59-33176, 59-33177, 59-155088, 60-11389, 60-49990, 60-83882, 60-109894, 62-198493, 63-49478, 63-115780, 63-280681, 1-40371, 6-234268, 7-125411, 10-193776, and PCT International Publication No. WO 99/64248. The weight average molecular weight of the cationic polymer which can be used in the invention is preferably 100,000 or less, more preferably 50,000 or less, particularly preferably about in the range of 2000 to 30,000.

The amount of the cationic polymer is preferably in the range of 1% by mass to 10% by mass based on the amount of silica fine particles in each ink receptive sublayer.

Hardener

The ink receptive sublayer preferably contains the binder together with a hardener.

Specific examples of the hardener include aldehyde compounds such as formaldehyde or glutaraldehyde; ketone compounds such as diacetyl or chloropentanedione; bis(2-chloroethylurea)-2-hydroxy-4,6-dichloro-1,3,5-triazine; a compound having a reactive halogen described in U.S. Pat. No. 3,288,775; divinylsulfone; a compound having a reactive olefin described in U.S. Pat. No. 3,635,718; N-methylol compound described in U.S. Pat. No. 2,732,316; isocyanates described in U.S. Pat. No. 3,103,437; aziridine compounds described in U.S. Pat. Nos. 3,017,280 and 2,983,611; carbodiimide compounds described in U.S. Pat. No. 3,100,704; epoxy compounds described in U.S. Pat. No. 3,091,537; halogen carboxyaldehydes such as mucochloric acid; dioxane derivatives such as dihydroxydioxane; chromium alum; zirconium sulfate; boric acid; and an inorganic hardener such as borate. The hardener may be used singly or in combination of two or more thereof. Among them, boric acid and borate are particularly preferable.

The content of the hardener in each ink receptive sublayer is preferably in the range of 0.1% by mass to 40% by mass, and more preferably in the range of 0.5% by mass to 30% by mass based on the content of the binder in each ink receptive sublayer.

Other Additives

Various known additives such as a coloring dye, a color pigment, an ultraviolet absorber, an antioxidant, a dispersing agent of pigment, a defoaming agent, a leveling agent, an antiseptic agent, a fluorescent whitening agent, a viscosity stabilizer, or a pH regulator may be further added to the ink receptive sublayer as additional components.

The pH of the coating liquid to be used for forming the ink receptive layer of the invention (for example, coating liquids A and B which will be described hereinafter) is preferably in the range of 3.3 to 6.5, and more preferably in the range of 3.5 to 5.5.

The storability of the recording medium which is subjected to printing can be significantly improved by adding at least one of thioether compound, carbohydrazide and derivative thereof to the ink receptive layer.

The carbohydrazide derivative may be a compound having one or two or more of a carbohydrazide structure in the same molecule or may be a polymer having the carbohydrazide structure in the main chain or a side chain of the polymer molecule.

Examples of the thioether compound include an aromatic thioether compound which has an aromatic group bound to each of both terminals of a sulfur atom and an aliphatic thioether compound which has an alkyl group at both terminals of its main structure in which a sulfur atom resides. Among them, an aliphatic thioether compound having a hydrophilic group is particularly preferable.

These compounds may be synthesized by known synthesis methods or those described in JP-A Nos. 2002-321447 and 2003-48372. Some commercially available chemical products of these compounds may be directly used as they are.

Support

Preferable examples of the support in the recording medium used in the invention include: polyester resin such as polyethylene terephthalate; plastic resin films such as diacetate resin, triacetate resin, acrylic resin, polycarbonate resin, polyvinyl chloride, polyimide resin, cellophane, or celluloid; a film obtained by pasting paper and resin film together; and a waterproof support such as a polyolefin resin coating paper in which a polyolefin resin layer is coated onto both sides of a base paper. The thickness of these waterproof supports is 50 µm to 300 µm, and preferably 80 µm to 260 µm.

Hereinafter, the polyolefin resin coating paper which can be preferably used as the support in the invention will be described.

There is no particular limitation to the water content of the polyolefin resin coating paper, while it is preferably in the range of 5.0% to 9.0%, and more preferably 6.0% to 9.0% from the viewpoint of curl preventing properties. The water content of the polyolefin resin coating paper may be measured by arbitrarily selected methods for measuring water content. Examples thereof include a method using an infrared moisture meter, the oven dry weight method, the dielectric method, and the Karl Fischer method.

The base paper which configurates the polyolefin resin coating paper is not particularly limited, and the generally used paper may be used therefor, while a smooth base paper such as that used as a support for photographs can be used in preferable embodiments. Natural pulp, regenerated pulp, and synthetic pulp can be used singly or as a mixture of two or more thereof as pulp to form the base paper. Additives such as a sizing agent, a paper reinforcing agent, a loading material, an antistatic agent, a fluorescent whitening agent, or a dye, which generally used in the papermaking industry, may be added to the base paper.

The surface of the base paper may be coated with a surface sizing agent, a paper surface reinforcing agent, a fluorescent whitening agent, an antistatic agent, a dye, and/or an anchor agent.

The thickness of the base paper is not particularly limited. The surface of the base paper is preferably smoothed by compression through calendering or the like during or after papermaking. It is preferable that the basis weight of the base paper is in the range of 30 g/m$^2$ to 250 g/m$^2$.

Examples of the polyolefin resin to be applied onto the base paper include homopolymers of olefins such as low density polyethylene, high density polyethylene, polypropylene, polybutene, or polypentene, copolymers consisting of two or more olefins such as ethylene propylene copolymer, and mixtures thereof. Polyolefin resins having various densities and melt viscosity indexes (melt index) may be used singly or in combination of two or more thereof.

Examples of an additive which can be added to the resin of polyolefin resin coated paper include white pigments such as titanium oxide, zinc oxide, talc, or calcium carbonate; fatty acid amides such as stearic acid amide, or arachidic acid amide; fatty acid metal salts such as zinc stearate, calcium stearate, aluminum stearate, or magnesium stearate; antioxidants such as IRGANOX® 1010 or IRGANOX® 1076 (both trade names, manufactured by Ciba Specialty Chemicals Inc.); blue pigments or blue dyes such as cobalt blue, ultramarine blue, sicilian blue, or phthalocyanine blue; magenta pigments or magenta dyes such as cobalt violet, fast violet, or manganese purple; fluorescent whitening agents; and ultraviolet absorbers. These additives may be used singly or in combination of two or more thereof.

The method which is mainly used for forming the polyolefin resin coated paper is a so-called extrusion coating method, in which heat melted-polyolefin resin is cast onto the running base paper. Both sides of the base paper can be coated with the resin by the method. It is preferable that the base paper is subjected to activation treatments such as corona discharge treatment or flame treatment before applying the resin to the base paper. The thickness of the resin coating layer is suitably in the range of 5 µm to 50 µm.

It is preferable to provide an undercoat layer to the surface side of the support onto which the ink receptive layer is applied. The undercoat layer is provided by applying, before applying the ink receptive layer, a material for forming the undercoat layer onto the surface of the support by coating and drying or the like. The undercoat layer contains, as a main component thereof, a water-soluble polymer or a polymer latex (preferable examples thereof include water-soluble polymers such as gelatin, polyvinyl alcohol, polyvinyl pyrrolidone, or water-soluble cellulose, and particularly preferable examples thereof include gelatin) capable of forming the coating film. The coating amount of the water-soluble polymer on the surface of the support is preferably 10 mg/m$^2$ to 500 mg/m$^2$, and more preferably 20 mg/m$^2$ to 300 mg/m$^2$. It is preferable that the undercoat layer further contains a surfactant and a hardener. The formation of the undercoat layer on the support can be effective for preventing cracking of the ink receptive sublayer which may occur when the ink receptive sublayer is applied, and can provide the ink receptive layer having a uniform surface.

In view of preventing curling and improving effects of preventing sticking and ink transfer which may occur between the ink jet recording media when the medium is stacked (layered) immediately after being subjected to printing, any of various back layers may be formed on the surface of the support which is opposite to the surface side having the ink absorbing property achieved by the ink jet recording medium used in the present invention.

Method for Manufacturing Ink Jet Recording Medium

There is no particular limitation to a method for manufacturing the ink jet recording medium of the invention. Examples of the method include the following method for manufacturing the ink jet recording medium of the invention.

The method for manufacturing the ink jet recording medium of the invention includes at least applying an ink receptive layer coating liquid A which contains at least silica fine particles and a water-soluble aluminum compound (hereinafter sometimes simply referred as a "coating liquid A") and an ink receptive layer coating liquid B which contains at least silica fine particles and may preferably further contain a water-soluble zirconium compound (hereinafter sometimes simply referred as a "coating liquid B") so that the ink receptive layer coating liquid A and the ink receptive layer coating liquid B are applied in this order when viewed from the side of the support.

The components which are contained in the coating liquid A, i.e., the silica fine particles, the water-soluble aluminum compound, and other components which can be added as needed are respectively similar to the components which are contained in the ink receptive sublayer A, i.e., the silica fine particles, the water-soluble aluminum compound, and other components which can be added as needed. Further, the components which are contained in the coating liquid B. i.e., the silica fine particles, the water-soluble zirconium compound, and other components which can be added as needed are respectively similar to the components which are contained in the ink receptive sublayer B. i.e., the silica fine particles, the water-soluble zirconium compound, and other components which can be added as needed. Additional components which may be contained in the ink receptive sublayer may be used as the other components may be contained in the coating liquids A and B.

The condition of the support to be used in the method for manufacturing the recording medium, the conditions of the distributions of the water-soluble zirconium compound and the water soluble aluminum compound, and the like are similar to those for the ink jet recording material described above.

In the method for manufacturing the recording medium, the process for applying the coating liquids A and B (and other coating liquids to be used as needed) is not particularly limited as long as the coating liquids are applied in the order of the coating liquid A and the coating liquid B as viewed from the support side.

Examples of the process for the coating include: sequential coating in which a layer is coated one by one using a blade coater, an air knife coater, a roll coater, a bar coater, a gravure coater, a reverse coater or the like; multilayer simultaneous coating which uses a slide bead coater, a slide curtain coater or the like; and the "Wet-On-Wet method" described in paragraphs 0016 to 0037 of JP-A No. 2005-14593.

The process for the coating may be that including at least two selected from the sequential coating, the multilayer coating, and the Wet-On-Wet coating in combination.

The dry coating amount of the coating liquid A is preferably 12 g/m$^2$ or more, and more preferably 15 g/m$^2$ or more, from the viewpoint of ensuring the rate and the capacity of ink absorption of the recording medium.

The dry coating amount of the coating liquid B is preferably 8 g/m$^2$ or less, and more preferably in the range of 1 to 7 g/m$^2$, from the viewpoint of efficiently having the water-soluble zirconium compound be contained in the vicinity of the surface of the ink receptive sublayer at a high density.

Preparation of Coating Liquid

Subsequently, exemplary embodiments of the preparation method of an ink receptive layer coating liquid will be described, while the invention is not limited to the following examples. The scope of the "ink receptive layer coating liquid" herein includes an ink receptive sublayer coating liquid.

For example, the ink receptive layer coating liquid can be prepared by a preparation method including: adding fumed silica fine particles and a dispersing agent to water (for example, silica fine particles in water: 10 to 20% by mass); dispersing the resultant with a high speed rotation wet type colloid mill (trade name: CREAMIX, manufactured by M Technique Co., Ltd.) under a condition of a high-speed rotating of 10000 rpm (, which is preferably 5000 to 20000 rpm) for typically 20 minutes, (which is preferably for 10 to 30 minutes); adding a cross linking agent (for example, boric acid), a polyvinyl alcohol (PVA) solution (for example, the mass of PVA is set to about one third of the mass of the fumed silica), and a cationic emulsion to the resultant; adding the water-soluble polyvalent metal compound (for example, the water-soluble zirconium compound and the water-soluble aluminum compound) to the resultant; and dispersing the resultant under the same rotation conditions described above.

In this regard, the water-soluble polyvalent metal compound may be added to the coating liquid for forming the ink receptive sublayer by inline mixing just before the coating.

A liquid-liquid impact type disperser (for example, trade name: ULTIMAIZER, manufactured by Sugino Machine Limited) may be employed in the dispersing.

The thus-obtained coating liquid is in a uniform sol state. The coating liquid is coated onto the support by the following coating method and dried. A porous ink receptive layer(/sublayer) having a three-dimensional network structure can be thus formed.

The preparation of the aqueous dispersion containing the fumed silica and the dispersing agent dispersed in water may be performed by: adding, to an aqueous solution of the dispersing agent, an aqueous dispersion of the fumed silica which is prepared in advance; adding, to an aqueous dispersion of the fumed silica, an aqueous solution of the dispersing agent which is prepared in advance; or adding an aqueous solution of the dispersing agent and an aqueous dispersion of the fumed silica at the same time to be mixed during the preparation. Alternatively, in place of the aqueous dispersion of the fumed silica, fumed silica in a powder state may be employed to be added to the aqueous solution of the dispersing agent in the same manner as described above.

The fumed silica is mixed with the dispersing agent. Thereafter, the resulting mixture is subjected to fine-graining using a disperser to provide an aqueous dispersion containing fine particles with an average particle diameter of 50 to 300 nm. Examples of the disperser to be used to provide the aqueous dispersion include various kinds of conventionally known dispersers such as a high-speed rotating disperser, a medium-stirring type disperser (ball mill, sand mill, etc.), an ultrasonic disperser, a colloid mill disperser, or a high-pressure disperser. From the viewpoint of efficiently dispersing pellet-like fine particles being formed, the stirring type disperser, the colloid mill disperser, and the high-pressure disperser are preferable.

Examples of a solvent which can be used in each process include water, organic solvents, and solvents formed of mixtures thereof. Examples of the organic solvent to be used for the coating include alcohols such as methanol, ethanol, n-propanol, i-propanol, or methoxy propanol; ketones such as acetone or methyl ethyl ketone; tetrahydrofuran, acetonitrile, ethyl acetate, and toluene.

Cationic polymers may be used as the above-described dispersing agent. Examples of the cationic polymer include exemplified compounds of the mordant described in paragraphs 0138 to 0148 of JP-A No. 2006-321176. A silane coupling agent can be also preferably used as the dispersing agent.

The amount of the dispersing agent to be added is preferably 0.1% by mass to 30% by mass, and more preferably 1% by mass to 10% by mass, based on the amount of the fumed silica fine particles contained in the aqueous dispersion.

Other Processes (Cooling Process, Drying Process, Etc.)

The method for producing the ink jet recording material of the invention may include other processes such as cooling or drying performed after applying each coating liquid.

One exemplary embodiment of the method for producing the ink jet recording material of the invention which includes cooling and drying includes: cooling a film formed by applying the coating liquid over the support so that the temperature of the film becomes lower than the temperature of the coating liquid at the time of the coating by 5° C. or more; and drying the cooled coating film to form the ink receptive layer(/sublayer).

The cooling in the exemplary embodiment is preferably performed by having the support on which the coating layer is formed be cooled in a cooling zone kept at 0° C. to 1° C. for 5 seconds to 30 seconds. The temperature of the cooling zone is more preferably 0 to 5° C.

Here, the temperature of the coating layer can be measured by measuring the temperature of the surface of the coating layer.

Surface smoothness, glossiness, transparency, and coated film strength of the ink receptive layer can be improved by subjecting the ink receptive layer provided on the support to a calendar-process by transferring the intermediate product having the ink receptive layer and the support through a roller nip under heat and pressure using a super calender, a gloss calender or the like.

From the viewpoint of suitable porosity of the ink receptive layer, the temperature of the roll when the calendar process is performed is preferably 30° C. to 150° C., and more preferably 40° C. to 100° C. The linear pressure between the rollers employed in the calendar process is preferably 50 kg/cm to 400 kg/cm, and more preferably 100 kg/cm to 200 kg/cm.

Ink

The ink which can be used in the invention contains 8% by mass or more of a water-soluble solvent, the SP value determined by the Hoy method of which is 24 $(MPa)^{1/2}$ or less and the molecular weight (Mw) is 220 or more, and further contains a dye.

The change in color hue may be suppressed by using the above-described ink composition.

The SP value of the water-soluble solvent is 24 $(MPa)1/2$ or less. The SP value is more preferably 22 $(MPa)^{1/2}$ or less from the viewpoint of effectively obtaining an effect of the invention. On the other hand, the SP value is preferably 18 $(MPa)^{1/2}$ or more, and is more preferably 20 $(MPa)^{1/2}$ or more from the viewpoint of stability of the ink upon storage. From the viewpoint of suppression of change in color hue and stability of the ink upon storage, the SP value is preferably in a range of 18 $(MPa)^{1/2}$ to 24 $(MPa)^{1/2}$, and is more preferably in a range of 20 $(MPa)^{1/2}$ to 22 $(MPa)^{1/2}$.

It is necessary that the molecular weight of the water-soluble solvent is 220 or more.

When the molecular weight of the water-soluble solvent is less than 220, the effect of suppressing change in color hue is decreased. While the causes of the decrease is not certain, one of the causes is considered that a binder (for example, polyvinyl alcohol) which can be included in the ink receptive layer is easily swollen with a water-soluble solvent having a molecular weight of less than 220.

From the viewpoint of suppression of change in color hue, the molecular weight of the water-soluble solvent is preferably 230 or more.

The molecular weight of the water-soluble solvent is preferably 220 to 5,000, more preferably 230 or more, and further preferably 230 to 3,500, from the viewpoint of improving ink discharge stability and from the viewpoint of improving the compatibility between the ink and organic fine particles in the ink receptive layer.

When the water-soluble solvent consists of a single compound, the molecular weight of the water-soluble solvent refers to a molecular weight calculated from a chemical formula of its molecule. When the water-soluble solvent consists of a plurality of compounds, its molecular weight refers to the number-average molecular weight.

The content of the water-soluble solvent is 8% by mass or more based on the total amount of the ink. The content of the water-soluble solvent is preferably 12% by mass or more from the viewpoint of improving the effect of suppressing change in color hue. From the viewpoint of stability of the ink upon storage, the content is preferably 50% by mass or less, and is more preferably 30% by mass or less. From the viewpoint of suppression of change in color hue and stability of the ink upon storage, the content is preferably in a range of 8% by mass to 50% by mass, and is more preferably 12% by mass to 30% by mass.

In the invention, the "SP value measured by the Hoy method" refers to a parameter of solubility of a compound calculated by the Hoy method based on the structure of the compound. The Hoy method is a calculation method described in, for example, K. L. Hoy "Table of Solubility Parameters", Solvent and Coatings Materials Research and Development Department, Union Carbides Corp. (1985).

The water-soluble solvent (the specific solvent) in the invention is not particularly limited as long as its SP value is 24 $(MPa)^{1/2}$ or less and its molecular weight 220 or more. The solvent can be appropriately selected from polypropylene glycols, polyoxyethylene-polyoxypropylene glycols, polyoxyethylene-polyoxypropylene-alkyl ethers, polyoxyethylene-polyoxypropylene-glyceryl ethers, alkylene glycol monoalkyl ethers, and glycols with considering the structure of the water-soluble solvent.

Specific examples of the polypropylene glycols include NEWPOLE PP400 (trade name, manufactured by Sanyo Chemical Industries, Ltd., SP value: 21.3, Mw: 400).

Specific examples of the polyoxyethylene-polyoxypropylene glycols having a molecular weight exceeding 1,900 include NEWPOLE PE-61 (trade name, manufactured by Sanyo Chemical Industries, Ltd., SP value: 20.0), NEWPOLE PE-62 (trade name, manufactured by Sanyo Chemical Industries, Ltd., SP value: 20.1) and NEWPOLE PE-64 (trade name, manufactured by Sanyo Chemical Industries, Ltd., SP value: 20.4).

Specific examples of the polyoxyethylene-polyoxypropylene-alkyl ethers include NEWPOLE 50HB55 (SP value: 21.1, manufactured by Sanyo Chemical Industries, Ltd., Mw: 240), NEWPOLE 50HB100 (SP value: 20.6, manufactured by Sanyo Chemical Industries, Ltd., Mw: 540), NEWPOLE 50HB260 (SP value: 20.6, manufactured by Sanyo Chemical Industries, Ltd., Mw: 880), NEWPOLE 50HB400 (SP value: 20.4, manufactured by Sanyo Chemical Industries, Ltd., Mw: 1,340) and NEWPOLE 50HB660 (SP value: 20.5, manufactured by Sanyo Chemical Industries, Ltd., Mw: 1,800).

Specific examples of the polyoxyethylene-polyoxypropylene-glyceryl ethers include NEWPOLE GEP-2800 (SP value: 20.7, manufactured by Sanyo Chemical Industries, Ltd., Mw: 2,600).

Specific examples of the alkylene glycol monoalkyl ethers include tetraethylene glycol-α-methyl-α-methylol-pentylether (SP value: 22.8, Mw: 296).

The ink used in the invention may contain one or more water-soluble solvents having an SP value of 24 $(MPa)^{1/2}$ or less and a molecular weight of 220 or more.

The ink used in the invention may contain a water-soluble solvent having an SP value of more than 24 $(MPa)^{1/2}$ as long as the effect of the invention is not deteriorated.

Specific examples of the water-soluble solvent having an SP value of more than 24 $(MPa)^{1/2}$ include 3-ethoxy-1,2-propanediol (SP value: 25.9, Mw: 120), 1,6-hexanediol (SP value: 26.1, Mw: 118), 3-methyl-1,3-butanediol (SP value: 25.3, Mw: 104), 4-methyl-1,2-pentanediol (SP value: 24.3, Mw: 118), 1,2-hexanediol (SP value: 24.9, Mw: 118), diethylene glycol (DEG, SP value: 29.6, Mw: 106), polyethylene glycols such as PEG200 (SP value: 24.6, Mw: 200), and polyoxypropylene-glyceryl ethers such as NEWPOLE GP-250 (trade name, manufactured by Sanyo Chemical Industries, Ltd., SP value: 24.6, Mw: 250).

In the invention, the content of the water-soluble solvent having an SP value of more than 24 $(MPa)^{1/2}$ in the ink is typically 0 mass % to 40 mass %, preferably 5 mass % to 30 mass %, and more preferably 5 mass % to 20 mass %, with respect to the total mass of the ink.

The ink used in the invention may further contain a water-soluble solvent having a molecular weight of less than 220 as long as the effect of the invention is not deteriorated.

Specific examples of the water-soluble solvent having a molecular weight of less than 220 include ethylene glycol monobutyl ether (SP value: 22.5, Mw: 118), propylene glycol monobutyl ether (SP value: 21.5, Mw: 132), diethylene glycol monobutyl ether (SP value: 22.3, Mw: 162), triethylene glycol monobutyl ether (SP value 22.1, Mw: 206), triethylene glycol monomethyl ether (SP value: 23.4, Mw: 164), 2-ethyl-1,3-hexanediol (SP value: 23.0, Mw: 146), 2-butyl-2-ethyl-1,3-butanediol (SP value: 23.1, Mw: 166), and polypropylene glycols such as NEWPOLE PP-200 (trade name, manufactured by Sanyo Chemical Industries, Ltd., SP value: 23.8, Mw: 200).

The content of the water-soluble solvent having a molecular weight of less than 220 can be typically 0% by mass to 30% by mass, preferably 5% by mass to 25% by mass, and more preferably 10% by mass to 20% by mass based on the total amount of the ink.

The ink used in the invention preferably further contains at least one dye in addition to the water-soluble solvent. A dye which is generally used for ink jet may be used in the invention. Examples of dyes that can be used include coloring agents classified in the Color Index as oil-soluble dyes or basic dyes as well as dyes classified as acid dyes, direct dyes, reactive dyes, vat dyes, sulfide dyes or food dyes.

Examples of the dye further include azo dyes, azomethine dyes, xanthene dyes, and quinone dyes. Specific examples of the dye are shown below, while the invention is not limited by these.

C.I. acid yellow 1, 3, 11, 17, 18, 19, 23, 25, 36, 38, 40, 42, 44, 49, 59, 61, 65, 67, 72, 73, 79, 99, 104, 110, 114, 116, 118, 121, 127, 129, 135, 137, 141, 143, 151, 155, 158, 159, 169, 176, 184, 193, 200, 204, 207, 215, 219, 220, 230, 232, 235, 241, 242, and 246;

C.I. acid orange 3, 7, 8, 10, 19, 24, 51, 56, 67, 74, 80, 86, 87, 88, 89, 94, 95, 107, 108, 116, 122, 127, 140, 142, 144, 149, 152, 156, 162, 166, and 168:

C.I. acid red 1, 6, 8, 9, 13, 18, 27, 35, 37, 52, 54, 57, 73, 88, 97, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, and 415;

C.I. acid violet 17, 19, 21, 42, 43, 47, 48, 49, 54, 66, 78, 90, 97, 102, 109, and 126;

C.I. acid blue 1, 7, 9, 15, 23, 25, 40, 62, 72, 74, 80, 83, 90, 92, 103, 104, 112, 113, 114, 120, 127, 128, 129, 138, 140, 142, 156, 158, 171, 182, 185, 193, 199, 201, 203, 204, 205, 207, 209, 220, 221, 224, 225, 229, 230, 239, 249, 258, 260, 264, 278, 279, 280, 284, 290, 296, 298, 300, 317, 324, 333, 335, 338, 342, and 350;

C.I. acid green 9, 12, 16, 19, 20, 25, 27, 28, 40, 43, 56, 73, 81, 84, 104, 108, and 109;

C.I. acid brown 2, 4, 13, 14, 19, 28, 44, 123, 224, 226, 227, 248, 282, 283, 289, 294, 297, 298, 301, 355, 357, and 413;

C.I. acid black 1, 2, 3, 24, 26, 31, 50, 52, 58, 60, 63, 107, 109, 112, 119, 132, 140, 155, 172, 187, 188, 194, 207, and 222;

C.I. direct yellow 8, 9, 10, 11, 12, 22, 27, 28, 39, 44, 50, 58, 79, 86, 87, 98, 105, 106, 130, 132, 137, 142, 147, and 153;

C.I. direct orange 6, 26, 27, 34, 39, 40, 46, 102, 105, 107, and 118;

C.I. direct red 2, 4, 9, 23, 24, 31, 54, 62, 69, 79, 80, 81, 83, 84, 89, 95, 212, 224, 225, 226, 227, 239, 242, 243, and 254;

C.I. direct violet 9, 35, 51, 66, 94, and 95;

C.I. direct blue 1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, and 291;

C.I. direct green 26, 28, 59, 80, and 85;

C.I. direct brown 44, 106, 115, 195, 209, 210, 222, and 223;

C.I. direct black 17, 19, 22, 32, 51, 62, 108, 112, 113, 117, 118, 132, 146, 154, 159, and 169;

C.I. basic yellow 1, 2, 11, 13, 15, 19, 21, 28, 29, 32, 36, 40, 41, 45, 51, 63, 67, 70, 73, and 91;

C.I. basic orange 2, 21, and 22;

C.I. basic red 1, 2, 12, 13, 14, 15, 18, 23, 24, 27, 29, 35, 36, 39, 46, 51, 52, 69, 70, 73, 82, and 109;

C.I. basic violet 1, 3, 7, 10, 11, 15, 16, 21, 27, and 39;

C.I. basic blue 1, 3, 7, 9, 21, 22, 26, 41, 45, 47, 52, 54, 65, 69, 75, 77, 92, 100, 105, 117, 124, 129, 147, and 151;

C.I. basic green 1 and 4;

C.I. basic brown 1;

C.I. reactive yellow 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, and 176;

C.I. reactive orange 1, 4, 5, 7, 11, 12, 13, 15, 16, 20, 30, 35, 56, 64, 67, 69, 70, 72, 74, 82, 84, 86, 87, 91, 92, 93, 95, and 107;

C.I. reactive red 2, 3, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228, and 235;

C.I. reactive violet 1, 2, 4, 5, 6, 22, 23, 33, 36, and 38;

C.I. reactive blue 2, 3, 4, 5, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, and 236;

C.I. reactive green 8, 12, 15, 19, and 21;

C.I. reactive brown 2, 7, 9, 10, 11, 17, 18, 19, 21, 23, 31, 37, 43, and 46;

C.I. reactive black 5, 8, 13, 14, 31, 34, and 39; and

C.I. food black 1 and 2.

Preferable examples of magenta dyes, cyan dyes, black dyes, and yellow dyes which can be used for the ink of the invention further include the following dyes.

Examples of the magenta dye to be used for the ink of the invention include an aryl- or heteroaryl-azo dye having a coupler component such as phenols, naphthols, or anilines; an azomethine dye having a coupler component such as pyrazolones or pyrazolo triazoles; a methine dye such as an Ally Liden dye, a styryl dye, a merocyanine dye, a cyanine dye, or an oxonol dye; a carbonium dye such as a diphenylmethane dye, a triphenylmethane dye, or a xanthene dye; a quinone dye such as naphthoquinone, anthraquinone, or anthra pyridone; and a condensed polycyclic dye such as a dioxazine dye, while the invention is not limited to thereto.

Preferable examples of the magenta dye to be used for the ink of the invention include heterocyclic azo dyes, and specific examples thereof include those described in pp. 35-55 of WO 2002/83795, pp. 27-42 of WO 2002/83662, paragraphs 0046 to 0059 of JP-A No. 2004-14956, and paragraphs 0047 to 0060 of JP-A No. 2004-149561.

Examples of the cyan dye to be used for the ink of the invention include an aryl- or heteroaryl-azo dyes having a coupler component such as phenols, naphthols, or anilines; an azomethine dye having a coupler component such as phenols, naphthols, or heterocycles (e.g. pyrrolo triazole); a polymethine dye such as a cyanine dye, an oxonol dye, or a merocyanine dye; a carbonium dye such as a diphenylmethane dye, a triphenylmethane dye, or a xanthene dye; a phthalocyanine dye; an anthraquinone dye; and an indigo-thioindigo dye, while the invention is not limited to thereto.

Examples of a self-aggregative phthalocyanine dye include those described in WO 2002/60994, WO 2003/811, WO 2003/62324, and JP-A Nos. 2003-213167, 2004-75986, 2004-323605, 2004-315758, 2004-315807 and 2005-179469.

Examples of the black dye to be used for the ink of the invention include dis-azo dyes, tris-azo dyes, and tetra-azo dyes. These black dyes may be used in combination with a pigment such as a dispersion of carbon black.

Preferable examples of the black dye are specifically described in JP-A No. 2005-307177 in detail.

Examples of the yellow dye which can be used in the invention include those described in WO2005/075573, JP-A Nos. 2004-83903 (paragraphs 0024-0062), 2003-277661 (paragraphs 0021-0050), 2003-277262 (paragraphs 0042-0047), 2003-128953 (paragraphs 0025-0076), and 2003-41160 (paragraphs 0028-0064), and US2003/0213405 (paragraph 0108), and C.I. direct yellow 8, 9, 11, 12, 27, 28, 29, 33, 35, 39, 41, 44, 50, 53, 59, 68, 86, 87, 93, 95, 96, 98, 100, 106, 108, 109, 110, 130, 132, 142, 144, 161, and 163, C.I. acid yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227, C.I. reactive yellow 2, 3, 13, 14, 15, 17, 18, 23, 24, 25, 26, 27, 29, 35, 37, 41, and 42, and C.I. basic yellow 1, 2, 4, 11, 13, 14, 15, 19, 21, 23, 24, 25, 28, 29, 32, 36, 39, and 40. Examples of the yellow dye further include those described in JP-A No. 2007-191650 (paragraphs 0013-0112 and 0114-0121).

In the invention, the content of the dye in the ink is preferably 0.5 mass % to 30 mass %, and is more preferably 1.0 mass % to 15 mass % with respect to the total mass of the ink. When the content is 0.5 mass % or more, the printing density of an image formed of the ink can be made excellent. When the content is 30 mass % or less, an increase of the viscosity of the ink and the generation of the structural viscosity as the viscosity characteristics of the ink can be prevented, and the discharge stability of the ink through an ink jet nozzle can be improved.

For the purpose of securing its stability when it is left, improving discharge stability through an ink jet head, and preventing clogging or preventing deterioration, the ink used in the invention may contain various additives such as humectants, solubilizers, permeability regulators, viscosity modifiers, pH adjusters, solubilizers, antioxidants, preservatives, fungicides, corrosion suppressors, or chelators for scavenging metal ions influencing dispersion.

Ink Jet System

The method of applying ink by an ink jet system, which can be used in the ink jet recording method of the invention, is not particularly limited, and a known ink jet system may be used. Specific examples thereof include: a method of intermittently discharging ink stored in a nozzle head portion by an electric signal converted from a mechanical signal by an electrostrictive element; and a method of intermittently discharging ink stored in a nozzle head portion by rapidly heating a part at a portion very close to a discharging portion to generate bubbles and performing intermittent discharging by volume expansion of the bubbles.

The number of the ink(s) employed in the invention is not particularly limited. In embodiments of the ink jet recording method of the invention, an ink of a single color can be employed. In other embodiments of the ink jet recording method of the invention, plural inks which respectively have color different from each other (such as an ink set having three inks of a magenta ink, a cyan ink and a yellow ink or an ink set having four inks of a magenta ink, a cyan ink, a yellow ink and a black ink) can be employed.

EXAMPLES

The present invention will be explained in more detail by way of examples, which are not intended to limit the scope of the invention. The "parts" and "%" are on mass basis unless otherwise noted.

Preparation of Ink 1

Preparation of Magenta Ink 3.2% by weight of a compound M-1 having the following structure as a dye, 15% by weight of a solvent having a SP value of 24 $(MPa)^{1/2}$ or less and a molecular weight of 220 or more (trade name: NEWPOLE 50HB55, manufactured by Sanyo Chemical Industries, Ltd., the SP value and molecular weight are shown in Table 1) and corresponding to the "specific solvent", 10% by weight of diethylene glycol (hereinafter referred to as "DEG", SP value: 29.6, molecular weight: 106), and 1% by weight of acetylene glycol surfactant (trade name: OLFIN E1010, manufactured by Nissin Chemical Industry Co., Ltd.) were mixed with an ion exchange water to prepare a magenta ink of an ink 1.

Compound M-1

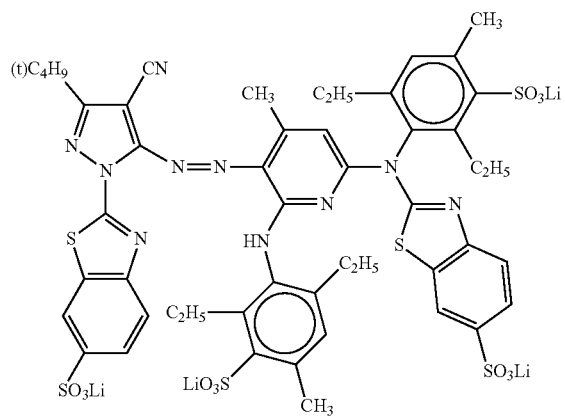

Preparation of Cyan Ink

A cyan ink of the ink 1 was prepared in the same manner as the magenta ink of the ink 1, except that 5.0% by weight of the compound C-1 having the following structure was used in place of the compound M-1.

Compound C-1

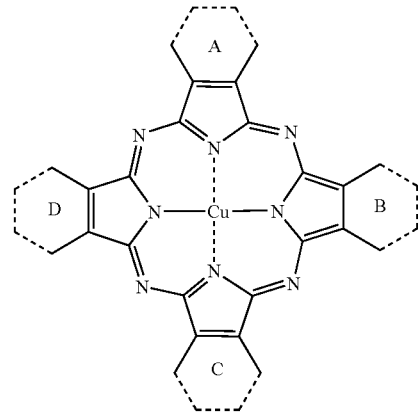

in which one among the rings A to D represents

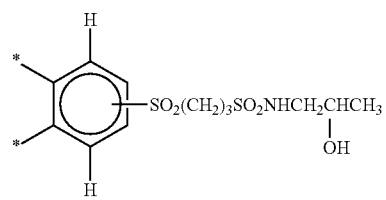

and other three ring respectively represent

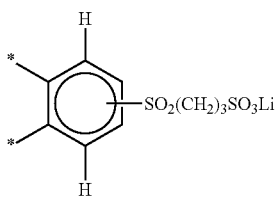

In the rings A to D, "*" designates a position at which each of the rings A to D is linked to the phthalocyanine ring of the compound M-2.

Preparation of Yellow Ink

A yellow ink of the ink 1 was prepared in the same manner as the magenta ink of the ink 1, except that 5.0% by weight of the compound Y-1 having the following structure was used in place of the compound M-1.

The ink 1, which is an ink set having the magenta ink, the cyan ink, the yellow ink and the black ink, was thus prepared.

Preparation of Ink 2

An ink 2 was prepared in the same manner as the ink 1, except that the content of the NEWPOLE 50HB55 (described above) was changed to 10% by weight and the content of the DEG was changed to 15% by weight in each of the magenta ink, the cyan ink, the yellow ink and the black ink.

Preparation of Ink 3

An ink 3 was prepared in the same manner as the ink 1, except that a solvent NEWPOLE 50HB400 (trade name, manufactured by Sanyo Chemical Industries, Ltd., the SP value and molecular weight are shown in Table 1) was used in place of the NEWPOLE 50HB55 (described above) in each of the magenta ink, the cyan ink, the yellow ink and the black ink.

Preparation of Ink 4

Compound Y-1

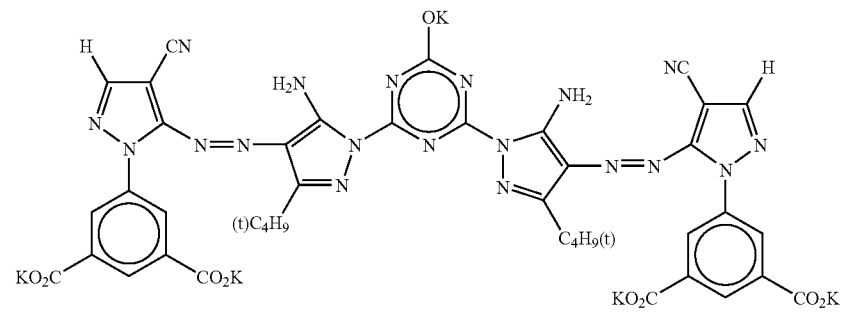

Preparation of Black Ink

A black ink of the ink 1 was prepared in the same manner as the magenta ink of the ink 1, except that 6.0% by weight of the compound Bk-1 having the following structure and 1.5% by weight of the compound Bk-2 having the following structure were used in place of the compound M-1.

An ink 4 was prepared in the same manner as the ink 1, except that 10% by weight of the NEWPOLE 50HB400 (described above) was used in place of the NEWPOLE 50HB55 (described above) and the content of the DEG was changed to 15% by weight in each of the magenta ink, the cyan ink, the yellow ink and the black ink.

Compound Bk-1

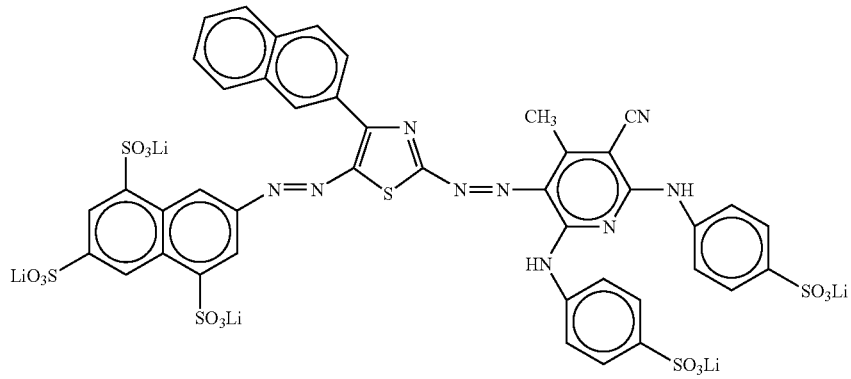

Compound Bk-2

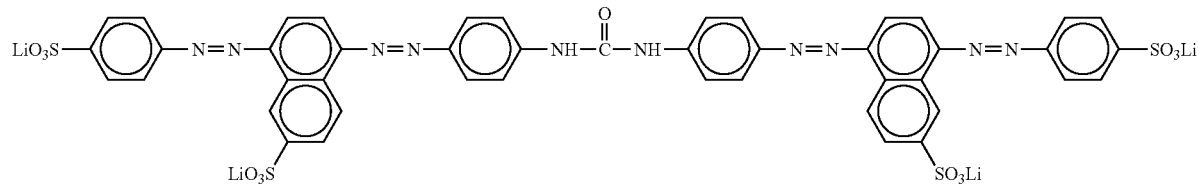

Preparation of Ink 5

An ink 5 was prepared in the same manner as the ink 1, except that 10% by weight of a solvent NEWPOLE GEP2800 (trade name, manufactured by Sanyo Chemical Industries, Ltd., the SP value and molecular weight are shown in Table 1) was used in place of the NEWPOLE 50HB55 (described above) and the content of the DEG was changed to 15% by weight in each of the magenta ink, the cyan ink, the yellow ink and the black ink.

Preparation of Ink 6

An ink 6 was prepared in the same manner as the ink 1, except that tetraethylene glycol-α-methyl-α-methyl-methylol-pentyl ether (hereinafter referred to as "MHDO4EO", the SP value and molecular weight are shown in Table 1) was used in place of the NEWPOLE 50HB55 (described above) in each of the magenta ink, the cyan ink, the yellow ink and the black ink.

Preparation of Ink 7

An ink 7 was prepared in the same manner as the ink 1, except that 10% by weight of MHDO4EO was used in place of the NEWPOLE 50HB55 (described above) and the content of the DEG was changed to 15% by weight in each of the magenta ink, the cyan ink, the yellow ink and the black ink.

Preparation of Ink 8 for Comparative Example

An ink 8 for a comparative example was prepared in the same manner as the ink 1, except that 5% by weight of NEWPOLE GEP2800 (described above) was used in place of the NEWPOLE 50HB55 (described above) and the content of the DEG was changed to 20% by weight in each of the magenta ink, the cyan ink, the yellow ink and the black ink.

Preparation of Ink 9 for Comparative Example

An ink 9 for a comparative example was prepared in the same manner as the ink 1, except that polyethylene glycol 300 (hereinafter referred to as "PEG300", the SP value and molecular weight are shown in Table 2) was used in place of the NEWPOLE 50HB55 (described above) in each of the magenta ink, the cyan ink, the yellow ink and the black ink.

Preparation of Ink 10 for Comparative Example

An ink 10 for a comparative example was prepared in the same manner as the ink 1, except that 2,5-dimethyl-2,5-hexanediol (hereinafter referred to as "DMHDO", the SP value and molecular weight are shown in Table 2) was used in place of the NEWPOLE 50HB55 (described above) in each of the magenta ink, the cyan ink, the yellow ink and the black ink.

Preparation of Ink 11 for Comparative Example

An ink 11 for a comparative example was prepared in the same manner as the ink 1, except that glycerol (the SP value and molecular weight are shown in Table 2) was used in place of the NEWPOLE 50HB55 (described above) in each of the magenta ink, the cyan ink, the yellow ink and the black ink.

Preparation of Ink 12 for Comparative Example

An ink 12 for a comparative example was prepared in the same manner as the ink 1, except that triethylene glycol monobutyl ether (hereinafter referred to as "TEGmBE", the SP value and molecular weight are shown in Table 2) was used in place of the NEWPOLE 50HB55 (described above) in each of the magenta ink, the cyan ink, the yellow ink and the black ink.

Preparation of Ink Jet Recording Medium 1

Preparation of Support

A 1:1 mixture of broadleaf bleached kraft pulp (LBKP) and a broadleaf bleached sulfite pulp (LBSP) was beaten to have a freeness of 300 ml in terms of Canadian Standard Freeness (C.S.F.) to prepare pulp slurry. An alkyl ketene dimer, which works as a sizing agent, with an amount of 0.5% based on the pulp respectively, polyacrylamide, which works as a reinforcing agent, with an amount of 1% based on the pulp, cationized starch with an amount of 2% based on the pulp, and a polyamide epichlorohydrin resin with an amount of 0.5% based on the pulp were added to the slurry, and the resulted mixture was diluted with water to prepare a slurry having the beaten pulp concentration of 1%. This slurry was subjected to a four-drinier paper machine to form paper having a basis weight of 170 g/m$^2$, followed by drying and humidity conditioning, to produce a base paper for forming a polyolefin resin-coated paper. A polyethylene resin composition, which is formed by uniformly dispersing, to a 100 mass % of a low-density polyethylene having a density of 0.918 g/cm$^3$, 10 mass % of anatase titanium, was melted at 320° C., extruded at 200 m/min to be a layer having a thickness of 35 μm provided onto a printing side of the produced base paper, and cooled on a minutely roughened cleaning roll, to form a resin coating layer which resides at a side of a polyolefin resin-coated paper to which an ink receiving layer is to be provided. Similarly, a resin composition prepared by blending 70 parts of a high-density polyethylene resin having a density of 0.962 g/cm$^3$ with 30 parts of a low-density polyethylene resin having a density of 0.918 g/cm$^3$ was melted at 320° C. and extrusion-coated to be a layer having a thickness of 30 μm provided onto the reverse surface of the base paper with a roughened cleaning roll to form a resin reverse surface of the polyolefin resin-coated paper.

The side of the polyolefin resin-coated paper to be provided with an ink receiving layer was subjected to high-frequency corona discharge treatment, and then applied with an undercoat layer having the following formulation so that the coating amount of gelatin per square meter became 50 mg/m$^2$, followed by drying to form an undercoat layer thereon. A support was prepared as a result.

Formulation of Undercoat layer

| | |
|---|---|
| Lime-treated gelatin | 100 parts |
| 2-Ethylhexyl sulfosuccinate | 2 parts |
| Chrome alum | 10 parts |

Preparation of Ink Receptive Layer Coating Liquid

Preparation of Fumed Silica Dispersion Liquid 1

Dimethyl diaryl ammoniumchloride homopolymer was added to water (dispersion medium) and modified ethanol. Then, fumed silica was added thereto and subjected to pre-dispersing to produce a coarse dispersion liquid. Subsequently, the coarse dispersion liquid was treated by the high-pressure homogenizer twice so that a fumed silica dispersion liquid 1 having a silica concentration of 20% by mass was prepared. A specific formulation of the fumed silica dispersion liquid 1 is as follows. The average particle diameter of the fumed silica was 100 nm.

Formulation of Fumed Silica Dispersion Liquid 1

| | |
|---|---|
| Water | 430 parts by weight |
| Modified ethanol | 22 parts by weight |
| Cationic polymer (trade name: SHALLOL DC902P, dimethyl diaryl ammonium chloride homopolymer, manufactured by DAI-ICHI KOGYO SEIYAKU CO., LTD., average molecular weight: 9000) | 3 parts by weight |
| Fumed silica (average primary particle diameter: 7 nm, specific surface area measured by BET adsorption method: 300 m$^2$/g) | 100 parts by weight |

Preparation of Ink Receptive Layer Coating Liquid A-1

The following components were mixed and stirred to prepare an ink receptive layer coating liquid A-1.

Formulation of the Ink Receptive Layer Coating Liquid A-1

| | |
|---|---|
| The fumed silica dispersion liquid 1 | 100 parts by weight (as a solid content of the fumed silica) |
| Boric acid | 3 parts by weight |
| Polyvinyl alcohol (degree of saponification: 88%, average degree of polymerization: 3500) | 22 parts by weight |
| Basic polyaluminum hydroxide (trade name: PYURACHEM WT, manufactured by Riken Green Co., Ltd.) | 3 parts by weight |
| 1,1,5,5-tetramethylcarbohydrazide | 2 parts by weight |
| Betaine surfactant (trade name: SWANOL AM-2150, manufactured by Nihon Surfactant Kogyo K.K) | 0.1 part by weight |

Preparation of Ink Receptive Layer Coating Liquid B-1

The following components were mixed and stirred to prepare an ink receptive layer coating liquid B-1.

Formulation of the Ink Receptive Layer Coating Liquid B-1

| | |
|---|---|
| The fumed silica dispersion liquid 1 | 100 parts by weight (as a solid content of the fumed silica) |
| Boric acid | 3 parts by weight |
| Polyvinyl alcohol (degree of saponification: 88%, average degree of polymerization: 3500) | 20 parts by weight |
| Zirconyl acetate (trade name: ZIRCOSOL ZA-20, manufactured by Dai-Ichi Kigenso Kagaku. Kogyo Co. Ltd.) | 3 parts by weight |
| Betaine surfactant (trade name: SWANOL AM-2150, manufactured by Nihon Surfactant Kogyo K.K) | 0.3 part by weight |

Preparation of Ink Jet Recording Medium

The ink receptive layer coating liquid A-1 and the ink receptive layer coating liquid B-1 were simultaneous multilayer-coated on the surface of the support, the surface being provided with the undercoat layer, in the order of the ink receptive layer coating liquid A-1 and the ink receptive layer coating liquid B-1 as viewed from the support side with a slide bead coater. Here, the dry coating amount of the ink receptive layer coating liquid A-1 is 20 g/m² and the dry coating amount of the ink receptive layer coating liquid B-1 is 5 g/m².

Then, the coated film obtained by the simultaneous multilayer coating was cooled at 10° C. for 20 seconds. Thereafter, the coated film was dried by spraying heated air (at 30° C. to 55° C.) so as to provide an ink receptive layer.

An ink jet recording medium (recording medium 1) in which an ink receptive sublayer A-1 and an ink receptive sublayer B-1 were formed in this order on the undercoat layer of the support was thus obtained.

Each of the ink receptive layer of the recording medium 1 and recording medium 2 to 4, which will be described in the followings, has the thickness of 40 µm, and a concentration of aluminum in a portion of the ink receptive layer which extends from the surface to a 5 µm-depth in thickness therein is lower than a concentration of aluminum in a portion of the ink receptive layer which extends from the surface to a 20 µm-depth in thickness therein.

The ink receptive layer of the recording medium 5, which will be described in the following, has the thickness of 40 µm, and a concentration of aluminum in a portion of the ink receptive layer which extends from the surface to a 5 µm-depth in thickness therein is equal to a concentration of aluminum in a portion of the ink receptive layer which extends from the surface to a 20 µm-depth in thickness therein.

The ink receptive layer of the recording medium 6, which will be described in the following, has the thickness of 40 µm, and a concentration of aluminum in a portion of the ink receptive layer which extends from the surface to a 5 µm-depth in thickness therein is higher than a concentration of aluminum in a portion of the ink receptive layer which extends from the surface to a 20 µm-depth in thickness therein.

Preparation of Ink Jet Recording Medium 2

An ink jet recording medium 2 was prepared in the same manner as the ink jet recording medium 1 except that the amount of the zirconyl acetate used in the formulation of the ink receptive layer coating liquid B-1 was changed to 6 parts by weight.

Preparation of Ink Jet Recording Medium 3

An ink jet recording medium 3 was prepared in the same manner as the ink jet recording medium 1 except that the zirconyl acetate used in the formulation of the ink receptive layer coating liquid B-1 was changed to the same amount of zirconium oxychloride (manufactured by Nippon Light Metal Co., Ltd.).

Preparation of Ink Jet Recording Medium 4

An ink jet recording medium 4 was prepared in the same manner as the ink jet recording medium 1 except that the ink receptive layer coating liquid A-2 having the following formulation was used in place of the ink receptive layer coating liquid A-1.

Formulation of the Ink Receptive Layer Coating Liquid A-2

| | |
|---|---|
| The fumed silica dispersion liquid 1 | 50 parts by weight (as a solid content of the fumed silica) |
| The wet method silica dispersion liquid 1 | 50 parts by weight (as a solid content of the fumed silica) |
| Boric acid | 3 parts by weight |
| Polyvinyl alcohol (degree of saponification: 88%, average degree of polymerization: 3500) | 22 parts by weight |
| Basic polyaluminum hydroxide (trade name: PYURACHEM WT, manufactured by Riken Green Co., Ltd.) | 3 parts by weight |
| 1,1,5,5-tetramethylcarbohydrazide | 2 parts by weight |
| Betaine surfactant (trade name: SWANOL AM-2150, manufactured by Nihon Surfactant Kogyo K.K) | 0.1 part by weight |

Preparation of Wet Method Silica Dispersion Liquid 1

Sedimentation method silica was added to water and subjected to pre-dispersing using a sawtooth blade type disperser (blade peripheral speed: 30 m/sec) to prepare a pre-dispersion liquid. Then, the pre-dispersion liquid was once passed through a bead mill (zirconia beads having a diameter of 0.3 mm, filling factor of the beads: 80% by volume, disk peripheral speed: 10 m/sec) to prepare a wet method silica dispersion liquid 1 having a solid concentration of 30% by mass and an average particle diameter of 200 nm. The formulation of the wet method silica dispersion liquid 1 is as follows.

Formulation of Wet Method Silica Dispersion Liquid 1

| | |
|---|---|
| Water | 329 parts by weight |
| Cationic polymer (trade name: SHALLOL DC902P, dimethyl diaryl ammonium chloride homopolymer, manufactured by DAI-ICHI KOGYO SEIYAKU CO., LTD., average molecular weight: 9000) | 4 parts by weight |
| Sedimentation method silica (trade name: NIPSEAL VN3, manufactured by TOSOH SILICA CORPORATION, average secondary particle diameter: 23 μm) | 100 parts by weight |

Preparation of Ink Jet Recording Medium 5

An ink jet recording medium 5 was prepared in the same manner as the ink jet recording medium 1 except that an ink receptive layer coating liquid A-3 having the following formulation was coated on the surface of the support with a slide bead coater to form a single layer having a dry coating amount of 25 g/m² in place of the simultaneous multilayer coating of the ink receptive layer coating liquid A-1 and the ink receptive layer coating liquid B-1.

Formulation of the Ink Receptive Layer Coating Liquid A-3

| | |
|---|---|
| The fumed silica dispersion liquid 1 | 100 parts by weight (as a solid content of the fumed silica) |
| Boric acid | 3 parts by weight |
| Polyvinyl alcohol (degree of saponification: 88%, average degree of polymerization: 3500) | 22 parts by weight |
| Zirconyl acetate (trade name: ZIRCOSOL ZA-20, manufactured by Dai-Ichi Kigenso Kagaku. Kogyo Co. Ltd.) | 3 parts by weight |
| Basic polyaluminum hydroxide (trade name: PYURACHEM WT, manufactured by Riken Green Co., Ltd.) | 3 parts by weight |
| 1,1,5,5-tetramethylcarbohydrazide | 2 parts by weight |
| Betaine surfactant (trade name: SWANOL AM-2150, manufactured by Nihon Surfactant Kogyo K.K) | 0.3 part by weight |

Preparation of Ink Jet Recording Medium 6

An ink jet recording medium 6 was prepared in the same manner as the ink jet recording medium 1, except that an ink receptive layer coating liquid A-4 having the following formulation was used in place of the ink receptive layer coating liquid A-1, and an ink receptive layer coating liquid B-2 having the following formulation was used in place of the ink receptive layer coating liquid B-1.

Formulation of the Ink Receptive Layer Coating Liquid A-4

| | |
|---|---|
| The fumed silica dispersion liquid 1 | 100 parts by weight (as a solid content of the fumed silica) |
| Boric acid | 3 parts by weight |
| Polyvinyl alcohol (degree of saponification: 88%, average degree of polymerization: 3500) | 22 parts by weight |
| Zirconyl acetate (trade name: ZIRCOSOL ZA-20, manufactured by Dai-Ichi Kigenso Kagaku. Kogyo Co. Ltd.) | 3 parts by weight |
| 1,1,5,5-tetramethylcarbohydrazide | 2 parts by weight |
| Betaine surfactant (trade name: SWANOL AM-2150, manufactured by Nihon Surfactant Kogyo K.K) | 0.1 part by weight |

Formulation of the Ink Receptive Layer Coating Liquid B-2

| | |
|---|---|
| The fumed silica dispersion liquid 1 | 100 parts by weight (as a solid content of the fumed silica) |
| Boric acid | 3 parts by weight |
| Polyvinyl alcohol (degree of saponification: 88%, average degree of polymerization: 3500) | 20 parts by weight |
| Basic polyaluminum hydroxide (trade name: PYURACHEM WT, manufactured by Riken Green Co., Ltd.) | 3 parts by weight |
| Betaine surfactant (trade name: SWANOL AM-2150, manufactured by Nihon Surfactant Kogyo K.K) | 0.3 part by weight |

Preparation of Ink Jet Recording Medium 7 (for Comparative Examples)

An ink jet recording medium 7, which is a sample to prepare Comparative examples in the following, was prepared in the same manner as the ink jet recording medium 1, except that the inclusion of the basic polyaluminum hydroxide in the ink receptive layer coating liquid A-1 was omitted.

Ink Jet Recording

Example 1

Each of the inks 1 to 7 prepared as described above was refilled in a cartridge of an ink jet printer (trade name: PX-A740, manufactured by Seiko Epson Corporation) and used in ink jet recording with maximum ink discharge to print a solid image having gray color on each of the ink jet recording mediums 1 to 6 prepared as described above.

Comparative Example 1

Ink jet recording was performed in Comparative example 1 in the same manner as Example 1, except that the inks 8 to 12 were respectively used in place of the inks 1 to 7.

Comparative Example 2

Ink jet recording was performed in Comparative example 2 in the same manner as Example 1, except that the ink jet recording media 7 was used in place of the ink jet recording media 1 to 6.

Comparative Example 3

Ink jet recording was performed in Comparative example 3 in the same manner as Comparative example 1, except that the inks 8 to 12 were respectively used in place of the inks 1 to 7, and the ink jet recording media 7 was used in place of the ink jet recording media 1 to 6.

Evaluation of Suppression of Change in Color Hue

Each of the recording medium which was subjected to the ink jet recording was subjected to measurements of the colour phase in each of the gray portions immediately after the printing (within 1 minute after the printing) and after 24 hours from the printing. The difference between the colour phase immediately after the printing and the colour phase after 24 hours from the printing was defined as a color difference ($\Delta E$).

Here, the measurement of the colour phase was performed by measuring L*a*b* under conditions of F8 for light source and 2 degree for viewing angle with a spectrophotometer (trade name: SPECTROLINO, manufactured by Gretag Macbeth).

The property to suppress change in color hue was evaluated from the color difference ($\Delta E$) thus obtained in accordance with the following evaluation criteria. Evaluation results are shown in Tables 1 and 2.

Criteria for Evaluation of Suppression of Change in Color Hue

AA ... $\Delta E<1$: Changes in the color hue are not observed at all.

A ... $1 \leqq \Delta E<2$: Changes in the color hue are hardly observed.

B ... $2 \leqq \Delta E<4$: Changes in the color hue are observed, but they are unnoticeable (within allowable range from practical viewpoint).

C ... $4 \leqq \Delta E<7$: Changes in the color hue are remarkably noticeable (beyond the allowable range from practical viewpoint).

D ... $7 \leqq \Delta E$: Changes in the color hue are big and a problematic level.

TABLE 1

| Ink set | Ink | | | | Recording medium No. | | | | | | |
| | Solvent | Content | SP | Molecular weight | Recording medium 1 | Recording medium 2 | Recording medium 3 | Recording medium 4 Upper layer | Recording medium 5 | Recording medium 6 | Recording medium 7* |
| --- | --- | --- | --- | --- | --- | --- | --- | --- | --- | --- | --- |
| | | | | | Zr(1)3%: 5 g/m² | Zr(1)6%: 5 g/m² | Zr(2)3%: 5 g/m² | Zr(1)3%: 5 g/m² Lower layer | (Without upper layer) | Al: 5 g/m² | (Without upper layer) |
| | | | | | Al: 20/m² | Al: 20 g/m² | Al: 20 g/m² | Al: 20 g/m² Silica | Zr(1), Al: 25 g/m² | Zr(1): 20 g/m² | Zr(1): 25 g/m² |
| | | | | | Vapor phase method | Vapor phase method | Vapor phase method | Vapor phase method/ sedimentation method | Vapor phase method | Vapor phase method | Vapor phase method |
| Ink 1 | 50HB55 | 15% | 21.1 | 240 | AA | AA | AA | AA | A | B | C |
| Ink 2 | 50HB55 | 10% | 21.1 | 240 | A | A | A | A | A | B | C |
| Ink 3 | 50HB100 | 15% | 20.6 | 540 | AA | AA | AA | AA | A | B | C |
| Ink 4 | 50HB400 | 10% | 20.4 | 1340 | A | A | A | A | A | B | C |
| Ink 5 | GEP2800 | 10% | 20.7 | 2600 | A | A | A | A | A | B | C |
| Ink 6 | MHDO4EO | 15% | 22.8 | 296 | A | A | A | A | A | B | C |
| Ink 7 | MHDO4EO | 10% | 22.8 | 296 | B | B | B | B | B | B | C |

*Recording medium 7 was prepared for comparison.

TABLE 2

| | Recording medium No. | | | | | | |
| --- | --- | --- | --- | --- | --- | --- | --- |
| | Recording medium 1 | Recording medium 2 | Recording medium 3 | Recording medium 4 Upper layer | Recording medium 5 | Recording medium 6 | Recording medium 7* |
| | Zr(1)3%: 5 g/m² | Zr(1)6%: 5 g/m² | Zr(2)3%: 5 g/m² | Zr(1)3%: 5 g/m² Lower layer | (Without the upper layer) | Al: 5 g/m² | (Without upper layer) |
| | Al: 20/m² | Al: 20 g/m² | Al: 20 g/m² | Al: 20 g/m² | Zr(1), Al: 25 g/m² | Zr(1): 20 g/m² | Zr(1): 25 g/m² |

| | Ink | | | | Silica | | | | | | |
|---|---|---|---|---|---|---|---|---|---|---|---|
| Ink set | Solvent | Content | SP | Molecular weight | Vapor phase method | Vapor phase method | Vapor phase method | Vapor phase method/ sedimentation method | Vapor phase method | Vapor phase method | Vapor phase method |
| Ink 8** | GEP2800 | 5% | 20.7 | 2600 | C | C | C | C | D | D | D |
| Ink 9** | PEG300 | 15% | 24.4 | 300 | C | C | C | C | C | C | C |
| Ink 10** | DMHDO | 15% | 21.7 | 146 | C | C | C | C | C | C | C |
| Ink 11** | Glycerin | 15% | 35.5 | 92 | D | D | D | D | D | D | D |
| Ink 12** | TEGmBE | 15% | 22.1 | 206 | C | C | C | C | C | C | C |

*Recording medium 7 was prepared for comparison.
**Inks 8 to 12 were prepared for comparison.

The "SP" in the column of the ink indicates the SP value (unit: $(MPa)^{1/2}$) of each ink set determined by the Hoy method.

In the column of the recording medium, the "Zr (1)" indicates zirconyl acetate, the "Zr (2)" indicates zirconium oxychloride, and the "Al" indicates the water-soluble aluminum compound (basic polyaluminum hydroxide).

In the columns of the upper layer and the lower layer of the recording medium, the expression like "Zr(1) X %:Yg/m$^2$" indicates that X % by mass of zirconyl acetate is included in the layer based on the total amount of silica in the layer and the dry coating amount of the layer is Yg/m$^2$.

As shown in Table 1, when the ink jet recording was performed on the ink receptive layers of any one of the recording medium 1 to 6 using any one of the inks 1 to 7, the change in color hue was suppressed.

While examples in which specific concrete compounds are used as the water-soluble aluminum compound, the dye, and the water-soluble solvent have been described in the above, suppressing the change in color hue can be also achieved by performing ink jet recording by providing, on the ink receptive layer containing the water-soluble aluminum compound, an ink which contains a dye and 8% by mass or more of a water-soluble solvent having a SP value of 24 $(MPa)^{1/2}$ or less and a molecular weight of 220 or more even when a combination of compounds other than the above-described specific concrete compounds are used.

What is claimed is:

1. An ink jet recording method comprising applying an ink onto an ink jet recording medium by ink jet technology,
    the recording medium comprising a support and an ink receptive layer which is provided on or above the support and comprises a water-soluble aluminum compound, and
    the ink comprising a dye and 8% by mass or more of a water-soluble solvent based on the total amount of the ink, the water-soluble solvent having a SP value of 24 $(MPa)^{1/2}$ or less according to the Hoy method and a molecular weight of 220 or more,
    wherein the mass ratio of a concentration of aluminum in a portion of the ink receptive layer which extends from the surface of the ink receptive layer to a depth of 5 μm in the thickness direction of the ink receptive layer to a concentration of aluminum in a portion of the ink receptive layer which extends from the surface of the ink receptive layer to a depth of 20 μm in the thickness direction of the ink receptive layer is 0 or more and less than 1.0.

2. The ink jet recording method of claim 1, wherein the SP value of the water-soluble solvent is 22 $(MPa)^{1/2}$ or less.

3. The ink jet recording method of claim 1, wherein the ink comprises 12% by mass or more of the water-soluble solvent.

4. The ink jet recording method of claim 1, wherein
    the ink receptive layer has a structure comprising a plurality of layers comprising an ink receptive sublayer A and an ink receptive sublayer B,
    the ink receptive sublayer B is farther from the support than the ink receptive sublayer A, and
    the amount of the water-soluble aluminum compound comprised in the ink receptive sublayer B is less than the amount of the water-soluble aluminum compound comprised in the ink receptive sublayer A.

5. The ink jet recording method of claim 4, wherein the mass ratio of the amount of the water-soluble aluminum compound contained in the ink receptive sublayer B to the amount of the water-soluble aluminum compound contained in the ink receptive sublayer A is 0 or more and less than 1.0.

* * * * *